United States Patent
Sinclair

(12) 
(10) Patent No.: US 6,401,788 B1
(45) Date of Patent: Jun. 11, 2002

(54) TIRE CHANGING APPARATUS AND METHOD

(76) Inventor: Rick Sinclair, P.O. Box 1531, Laguna Beach, CA (US) 92652

( * ) Notice: Subject to any disclaimer, the term of this patent is extended or adjusted under 35 U.S.C. 154(b) by 0 days.

(21) Appl. No.: 09/895,626

(22) Filed: Jun. 29, 2001

(51) Int. Cl.⁷ .............................................. B60C 25/132
(52) U.S. Cl. .......................................... 157/1.1; 157/13
(58) Field of Search ........................ 157/1.1, 1.2, 1.28, 157/14, 11, 13

(56) References Cited

U.S. PATENT DOCUMENTS

| | | | | |
|---|---|---|---|---|
| 4,060,170 A | * | 11/1977 | Walters | 414/427 |
| 5,433,042 A | * | 7/1995 | Billieres et al. | 451/49 |
| 6,247,516 B1 | | 6/2001 | Sinclair | 157/1.1 |

* cited by examiner

Primary Examiner—Joseph J. Hail, III
Assistant Examiner—David B. Thomas
(74) Attorney, Agent, or Firm—James G. O'Neill

(57) ABSTRACT

Apparatus and methods for dismounting and mounting tires onto vehicle wheels without removing the tires and wheels from the vehicle. The apparatus (26) includes three carriages (20, 22, 24), two of which have rotating drums (32, 34) for rotating a tire. One of the carriages (24) has a pair of tire bead breaking dowels (76, 77) mounted on the carriage and operated by a power source. Tire cutting knives (84) are held in the dowels for selectively cutting up a tire (98) mounted on a wheel (100). The tire bead breaking dowels are operated to remove an old tire while the drum (34) on a rotational carriage (24) rotates the tire. The third carriage (20) includes a jack stand base (21) and a jack stand (74) to hold a vehicle in an elevated position after the drums in two of the carriages raise the tire, and wheel to either remove or mount a tire on the wheel. The apparatus is movable by means of wheels (48, 50, 52, 54) held thereon.

25 Claims, 9 Drawing Sheets

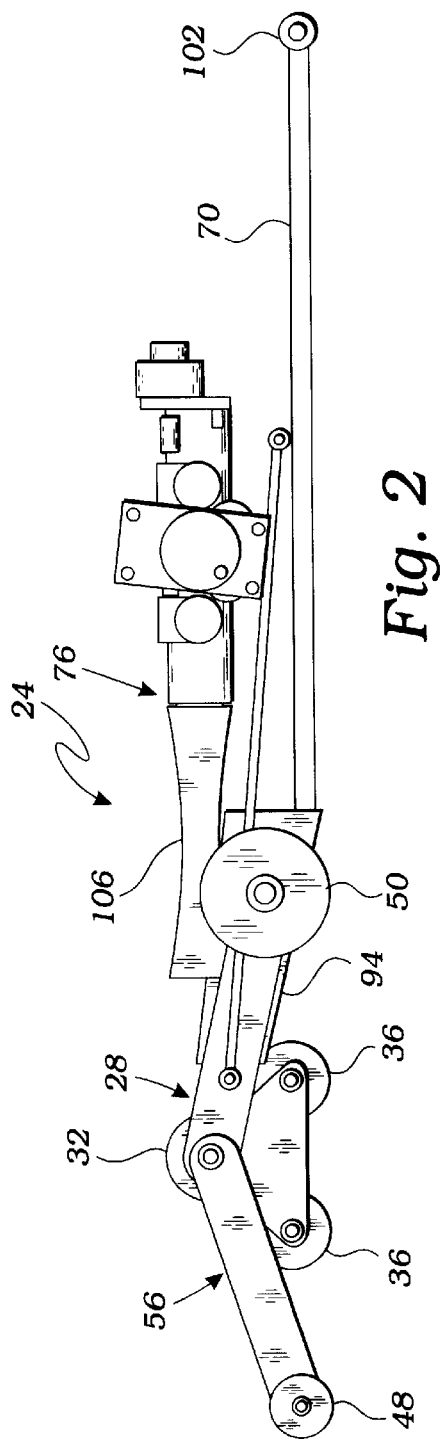
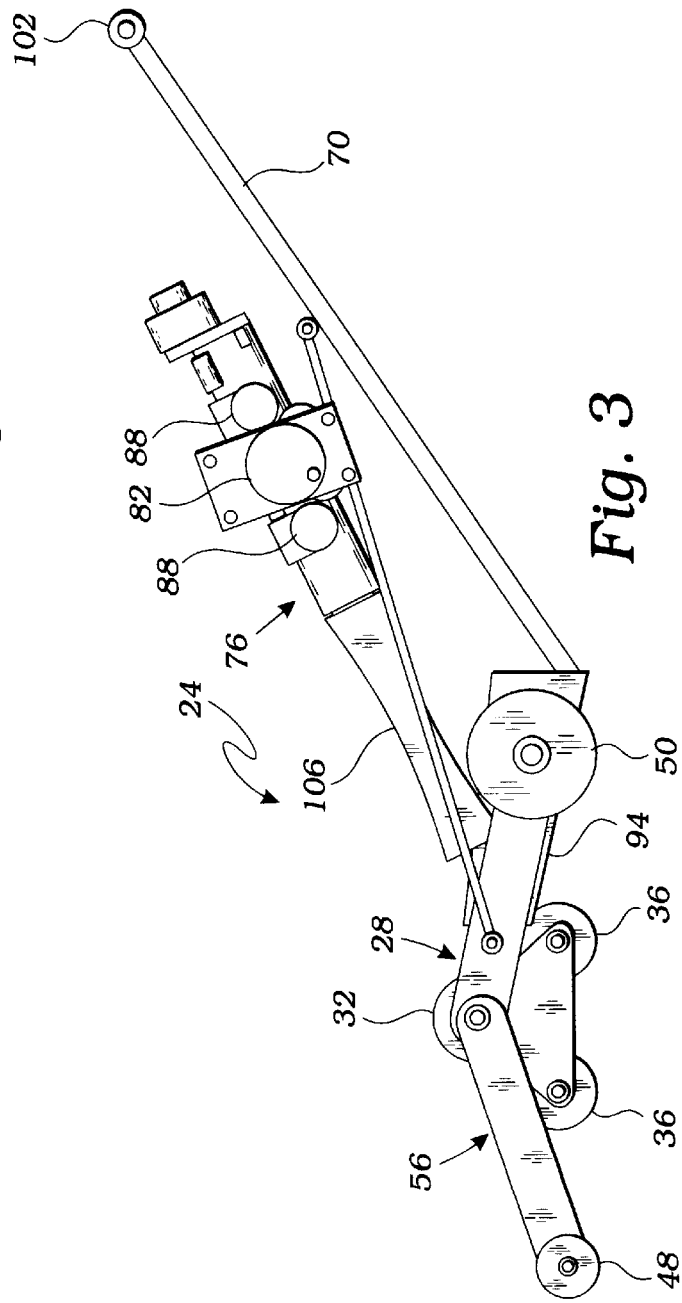

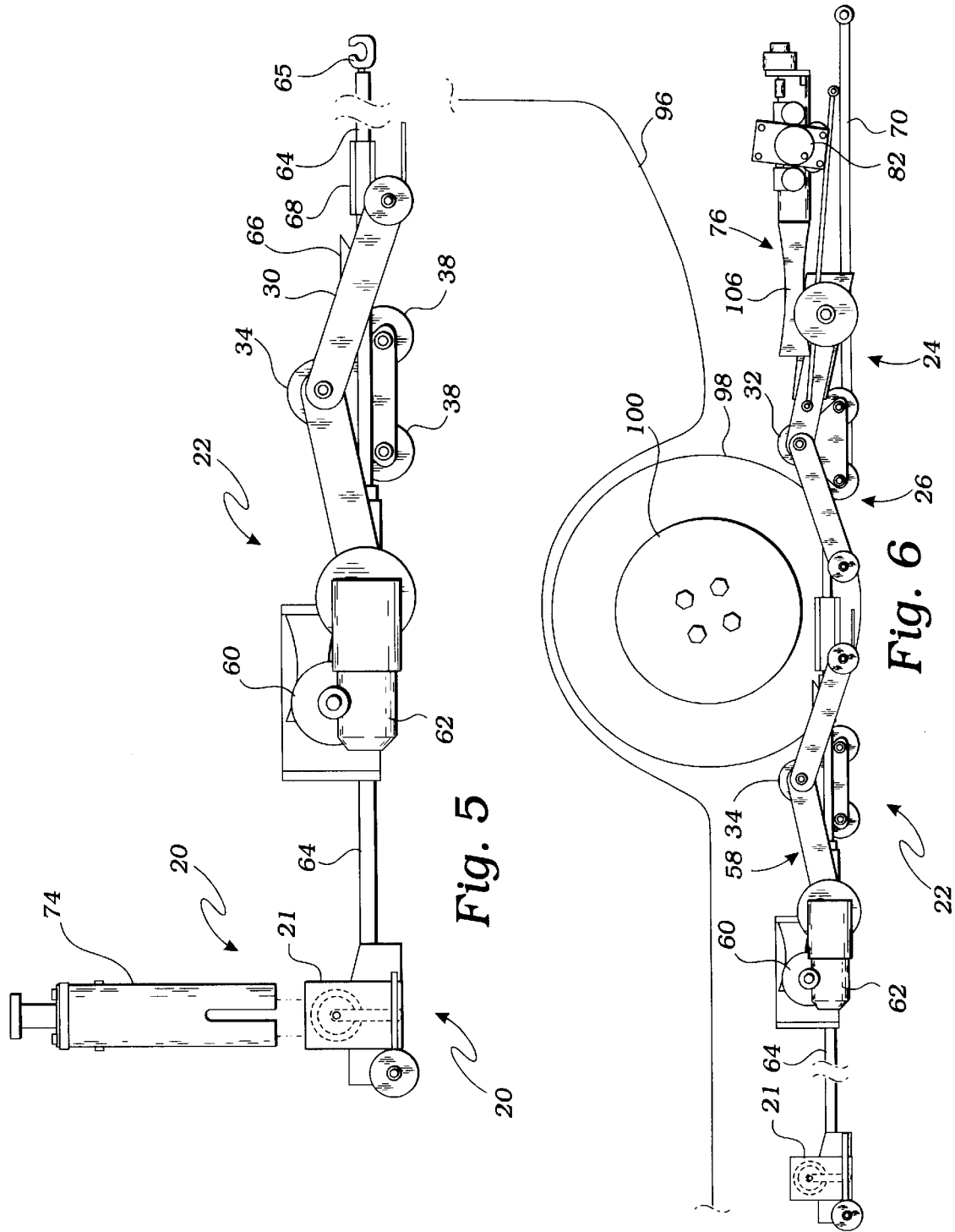

TIRE CHANGING APPARATUS AND METHOD

BACKGROUND OF THE INVENTION

1. Field of the Invention

This invention relates generally to the mounting and dismounting of tires on a rim, and, more particularly, to an apparatus and method of mounting, and dismounting and cutting of tires from a wheel while the wheel remains attached to a vehicle.

2. Description of Related Art

Applicant's U.S. Pat. No. 6,247,516, issued on Jun. 19, 2001 described one type of tire changer and mounting apparatus, that also cuts tires on a rim. The disclosure of this U.S. Pat. No. 6,247,516 ("'516") is incorporated herein, in its entirety, by this reference thereto.

Although the device and method described in the '516 patent mounts or dismounts and may cut a tire while the wheel remains on the vehicle, performs very well, the methods and apparatus of the present invention are considered to be an improvement thereto.

The '516 patent utilizes a bead deflecting device juxtaposed to a stationary rim and a rotating tire to effectively deflect the moving bead of the tire over the flange of the rim. This method, repeated for both beads of a tire, either mounts or dismounts a tire from a wheel while the wheel remains affixed to the car. This method works well, but an alternative method has been discovered and is deemed even more advantageous. Because of the stability of the apparatus of the present invention, as described below, it has been found to be more beneficial to leave the wheel free to rotate on a vehicle's axle and omit the use of a separate bead deflecting device. Instead, the beads of a tire are deflected over the flange of a rim with rotating dowels that are moved laterally across the width of the rim, as both the tire and its related wheel assembly are rotated on the vehicle. This technique eliminates the need to lock and unlock a vehicle's axle between the three different operations of cutting, mount/dismounting and balancing, as is required in the '516 patent. This improved method also eliminates the need to affix anything to the wheel, such as a bead deflector, thereby eliminating any possibility of damage to the wheel. The absence of these steps also speeds up operation time, thereby saving on labor.

The '516 patent discloses a machine that is placed in position under a tire after a vehicle has been raised by a separate jack. It also described how the vehicle is lowered by the jack so the wheel and tire assembly rest upon the body of the machine in order to apply pressure between the tire and a pair of rotating drums held in the machine to eliminate slippage between the same. In order to eliminate the need for a jack and, therefore, reduce the size of the tire changing apparatus for ease of mobility, the present invention provides an apparatus that embodies a lifting mechanism which raises the tire and wheel assembly off the ground. The present invention also includes a jack stand mechanism placed so that the weight of the vehicle's frame is lowered onto the jack stand. The jack stand, in turn, stabilizes the apparatus to prevent it from moving during operation. The same lifting mechanism used to raise the vehicle is also used to elevate separate motorized drums into the suspended tire and wheel assembly in order to make a non-slip contact between the motorized drums and the tire.

The '516 patent also describes an apparatus that applies equal pressure of two rotating drums on a tire to be mounted or dismounted. Research has shown that this works well. However, it has been found to be more advantageous to shift the apparatus of the present invention horizontally, in relation to the tire, in order to selectively allow only one rotating drum at a time to be used to contact the tire. Removing the second drum from contacting the tire has been found to enable the tire to be more easily displaced over the flange of the rim. A secondary benefit from having a displaced drum is the use of its elevating motion to elevate rotating dowels, described below. Once the tire and wheel assembly is suspended above the ground, an assembly of two rotating dowels included in the apparatus of the present invention are moved into position to accomplish their task. The wide variation in sizes of rims and tires used on various vehicles requires a wide range of settings for the rotating dowels to be properly positioned. The offset (displaced) drum and its elevating ability acts as the mechanism for this positioning. A third benefit from this design is that the two separate drums can be powered by two different motors having different speeds. A lower speed, higher torque, motorized drum is used in the mounting, dismounting and cutting of tires. While a second, higher speed lower torque motor may be used for rotating the offset drum so as to rotate the tire and wheel assembly for the purpose of balancing tires and wheels on a vehicle. The two motorized drums, with their two different speeds, do not interfere with each other, since they do not touch the tire at the same time during rotation.

In order to shift the apparatus of the present invention from one drum in contact with the tire to the other drum in contact with the tire, the present invention includes a unique jack stand that allows for lateral movement of the apparatus, while also providing stability during operation of the apparatus. Due to the employment of an elevation mechanism within the apparatus, no separate elevating jack, as described in the '516 patent is needed. This lowers the weight and allows increased mobility of the apparatus of the present invention. It also makes the apparatus an all-in-one machine and, therefore, easier to operate.

The '516 patent utilized "hats" for breaking the beads of a tire from the flange of a rim. However, the present invention uses a dowel carriage having a linear dowel shaft, upon which two dowels linearly move. One dowel is locked in position while the other dowel is moved laterally across the face of a wheel to break the seal between the bead of the tire and the flange of the rim. The process is then repeated with the dowels reversed to break the seal of the opposite bead. The dowel continues it's movement laterally across the width of the wheel thereby displacing both of the tire beads over the flange of the rim. The method of the present invention allows the wheel to rotate during the mounting and dismounting process, thereby providing the benefits of increased speed and convenience as described herein.

Therefore, there exists a need in the art for an apparatus that more efficiently mounts and dismounts tires onto wheels without the need for taking the wheels off the vehicle. And, further still there exists a need in the art for a machine that more efficiently cuts old tires before they are removed from a wheel, to change their shape and volume to make them easy to handle and less costly to dispose of

SUMMARY OF THE INVENTION

Accordingly, it is a general object of the present invention to provide an improved tire changer apparatus. It is a particular object of the present invention to provide an improved tire changer apparatus and method for using the same. It is another particular object of the present invention to provide an improved tire changing apparatus, which may also cut tires off of a wheel, while the wheel is still attached to the vehicle, in order to provide easier disposal of the old tire. It is yet another particular object of the present invention to provide an improved tire changing apparatus having means for elevating a vehicle's rim and tire assembly off the ground. It is yet a further particular object of the present invention to provide an improved tire changing apparatus and method, which includes a jack stand to support a vehicle and a pair of drums that, upon being fastened around a tire, collapse together and raise upwardly to aid in mounting, dismounting and cutting tires from wheels, while the wheels are still attached to a vehicle. It is yet a still further particular object of the present invention to provide an improved tire changing apparatus and method of use, includes a means for deflecting beads of a tire over a flange on a wheel that remains on a vehicle, by means of a rotating dowel affixed to the apparatus while the tire and wheel rotate on the vehicle. And, it is a particular object of the present invention to provide an apparatus having a plurality of separate carriages, secured together to work as a single apparatus.

These and other objects of the present invention are achieved by providing a tire changing device having three independent carriages for placement under a vehicle and around a wheel and tire assembly which is still attached to the vehicle. The device is used to raise the vehicle and break the seals between the tire beads and flanges of the wheel. The device may also cut the old tire being removed from the wheel into more than one part for easy disposal. The tire changing device of the present invention is formed with a pair of drums on two separate carriages used to selectively rotate a tire and wheel assembly for various reasons. A first carriage includes a bead deflection device, while a second carriage includes a drum for rotating a deflated tire to enable the tire changing device of the present invention to install a tire on or remove a tire from the wheel.

The novel method of the present invention includes the steps of positioning the device under a tire and wheel assembly; raising the wheel and tire assembly off the ground by use of the device; deflating the tire and lowering the vehicle onto a jack stand; moving a first drum into contact with the deflated tire and wheel assembly; moving a dowel assembly having knives therein into contact with the crown of the tire; turning the tire by rotating the first drum to cut the tire; removing the cut thread portion of the tire; contacting the sidewalls of the tires with dowels in a manner to break the tires' seal to the flange of the wheel and remove the remaining portion of the sidewall from the wheel. In some instances, the tire will not be cut, and the knife setting and cutting steps will be eliminated.

The novel method of the present invention is also used to mount a new tire onto an empty wheel, which is still fastened to the vehicle. The vehicle and wheel are usually in a position to provide sufficient clearance; to allow the tire to be mounted; the dowel tire bead deflectors, if not already in position, are moved to the tire to be mounted; the new tire is then turned and the dowels deflect the tire beads over the flange of the wheel to secure the tire loosely onto the wheel; the tire is then inflated to seal the tire beads to the flanges of the wheel. The tire and wheel may then be rotated by a further drum brought into contact with the inflated tire, so as to allow the tire and wheel to be balanced.

BRIEF DESCRIPTION OF THE DRAWINGS

The objects and features of the present invention, which are believed to be novel, are set forth with particularity in the appended claims. The present invention, both as to its organization and manner of operation, together with further objects and advantages, may best be understood by reference to the following description, taken in connection with the accompanying drawings, in which:

FIG. 2 is a side elevational view of FIG. 1;

FIG. 3 is a further side elevational view of FIG. 1 showing the dowels and a handlebar in an elevated position;

FIG. 5 is a side elevational view of FIG. 4;

FIG. 6 is a side elevational view of an assembled apparatus of the present invention showing the two main carriages and the jack stand carriage secured together around a tire and wheel, with the jack stand removed from the jack stand carriage;

DETAILED DESCRIPTION OF THE PREFERRED EMBODIMENT

Figure 1:
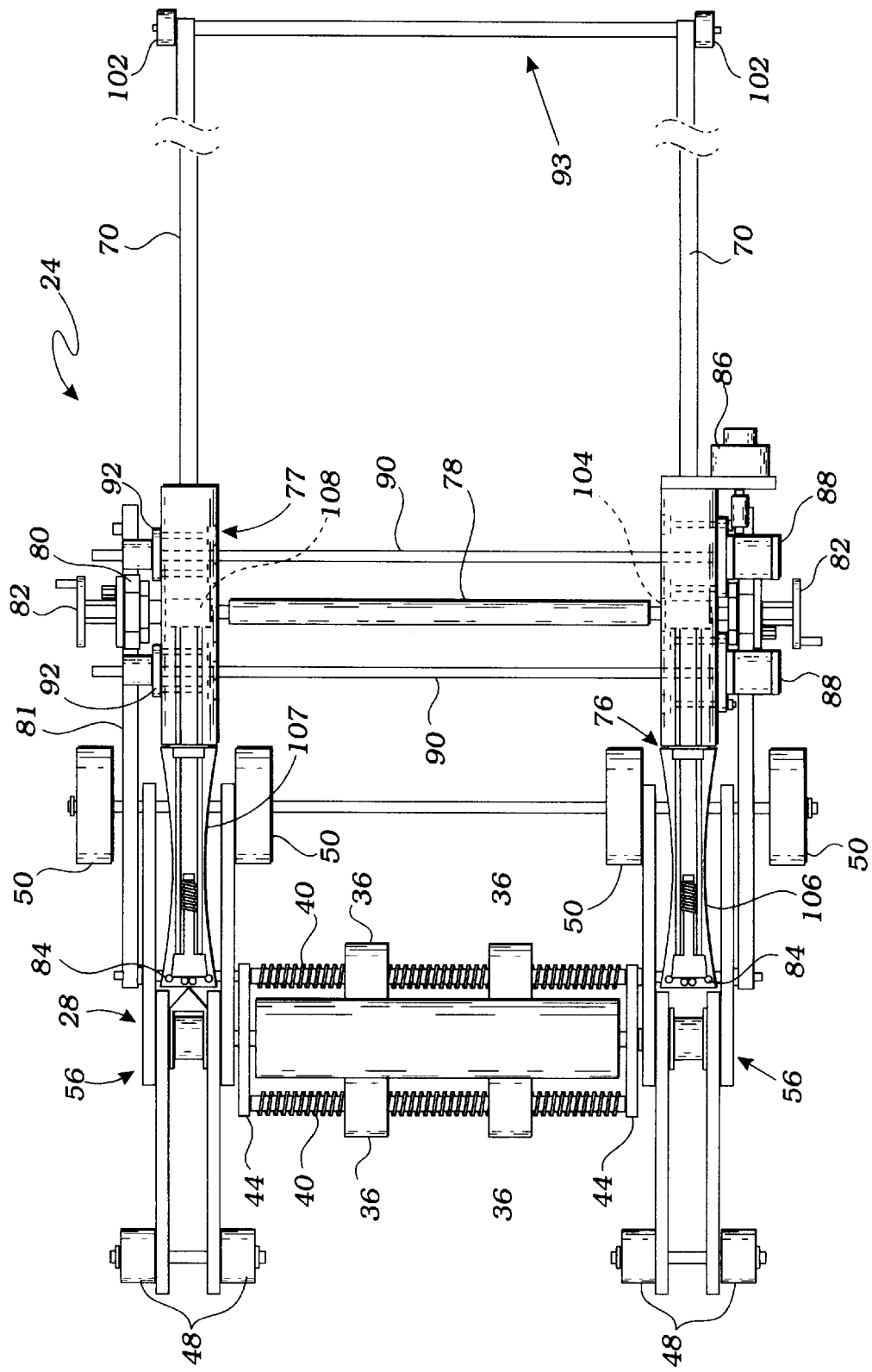
FIG. 1 is a top plan view of a first or dowel body or carriage of the present invention.

The following description is provided to enable any person skilled in the art to make and use the invention, and sets forth the best modes contemplated by the inventor of carrying out his invention. Various modifications, however, will remain readily apparent to those skilled in the art, since the generic principles of the present invention have been defined herein, specifically to provide for an improved and simplified tire changing device and method of mounting tires or dismounting tires from vehicle rims or wheels, while the wheels are still secured on a vehicle.

The present invention is basically composed of three separate elements or carriages. Each of the carriages is used for different purposes and has a number of separate parts. The carriages are assembled or placed under a vehicle, as explained more fully below, to remove or mount a tire and, if necessary, balance a newly added tire. The three carriages are comprised of a jack stand carriage, a dowel carriage and a rotational carriage. The dowel carriage is used to dismount and mount tires from wheels on a vehicle, and includes knives that are used to cut the old tires on wheels. Both the dowel carriage and the rotational carriage include drums, which when properly positioned, contact the face or tread portion of the tire. A jack stand held in a jack stand base is used to maintain the vehicle, tire and wheel in a raised position, after the dowel and rotational carriages elevate the tire and wheel of the vehicle off the ground.

The separate drums in the dowel and rotational carriages are raised vertically upwardly when operated in conjunction with each other. The dowel carriage is used to mount and dismount the tire from the raised wheel, while the drum of the rotational carriage is used to turn the tire during dismounting thereof.

The jack stand carriage, without a jack stand thereon is preferably connected to the rotational carriage, and the dowel carriage and rotational carriages connected together around the tire of a vehicle to be changed in a manner so that the drums on the dowel and rotational carriages are aligned with the face of the tire. The apparatus of the present invention is then activated to draw the dowel and rotational carriages together so that each drum comes into contact with the face of the tire, thereby cradling the tire between the two drums. As the two carriages of the apparatus continue to come together the drums move vertically upwardly, until the vehicle attains a predetermined height. A jack stand is then placed in the jack stand carriage so as to support the frame of the vehicle when the carriages and drums are pulled apart to lower the vehicle. The tire and wheel assembly of the vehicle, however, remains suspended off the ground by the jack stand. The tire is then deflated and the dowel carriage moved into position adjacent the deflated tire.

The jack stand holding the vehicle also allows the apparatus to move laterally, thus permitting the dowel and rotational carriages to be offset in relationship to the tire and wheel. When the apparatus is moved to the proper offset position the jack stand locks the apparatus in place. The offset position allows the rotational carriage to be driven into the tire to create a no slip contact with the tire and wheel for the purpose of rotating the tire and wheel. Or, the rotational carriage can be pulled away from the tire and wheel altogether in order to facilitate the removal of the old tire, or placement of a new tire. The dowel carriage will remain laterally stable, although it does move vertically upwardly, thus bringing the dowels on the dowel carriage into proper position diametrically aligned with the circumference of the tire.

If the tire is to be cut into sections the dowels are positioned so that knives, held in the dowels, are released and intersect the crown of the tire when the dowel assembly is activated to move into contact with the tire. Activation of a rotation motor on the rotational carriage will turn the tire against the knives to cut the tire. Whether the tire is cut or not, the method to deflect the beads over the flanges of the rim of the wheel remains the same. The dowel carriage is adjusted to bring the dowels close to the circumferential edges of the rim. A first dowel is locked so that only the second dowel contacts one of the tires sidewalls at a time. First, the outside sidewall (in relation to the vehicle) is compressed so that its seal with a first flange of the rim is broken. Secondly, the dowels are switched (outside dowel locked) and the inside dowel compressed to break the inside tire bead and a second rim flange seal. The inside dowel is allowed to continue its movement against the rotating tire and wheel, while the inside dowel rotates on its own axis, so as to displace or pull the tire completely off the wheel as the inside dowel moves across the face of the wheel.

The rotational carriage is backed away from the wheel to allow placement of the new tire to be installed. The new tire is placed against the rim of the wheel and driven into the wheel when the rotational carriage is brought back into contact with the tire. The outside dowel is used to compress the tire against the rim of the wheel and drive the beads of the tire over the outside flange of the wheel while the tire and wheel are being rotated against the rotating and transversing dowel. Once the tire is deflected onto the rim it is inflated.

The rotational carriage is then moved away, the jack stand carriage unlocked and the second drum on the dowel carriage moved into contact with the tire. The second drum is actuated by a second motor to allow the inflated tire to be rotated swiftly and balanced.

Turning to the drawings, a currently preferred embodiment of a tire changing device of the present invention will be described, as well the novel steps of the methods used in changing tires on wheels of a vehicle, without requiring removal of the wheels from the vehicle. As used herein the terms "rim" and "wheel" are synonymous. It is to be understood that the tire changing apparatus or device of the present invention may include different or substantially equivalent elements so long as they operate in the same manner to produce the same result. The tire changing apparatus or device of the present invention generally includes a jack stand body or carriage 20 having a base 21, a rotational body or carriage 22 and a dowel body or carriage 24. These bodies or carriages are secured together under a vehicle to form a tire changing apparatus 26 (see FIGS. 6–11).

The main operating portion of the apparatus 26 includes two distinct bodies or carriages 22, 24. Both carriages 22, 24 have similar frames 28, 30 that contain motorized drums 32, 34. Each drum 32, 34 is supported by two groups of wheels 36, 38, 48, 50, 52, 54 that actively support their carriage independently and at different times. Both carriages have linear wheels 36, 38 held on linear wheel shafts 40, 42 that are supported by linear wheel shaft supports 44, 46. A second group of wheels, preferably resilient wheels, 48, 50, 52, 54, such as rubber wheels, are supported by scissor arms 56, 58 on carriages 22, 24.

Figure 4:
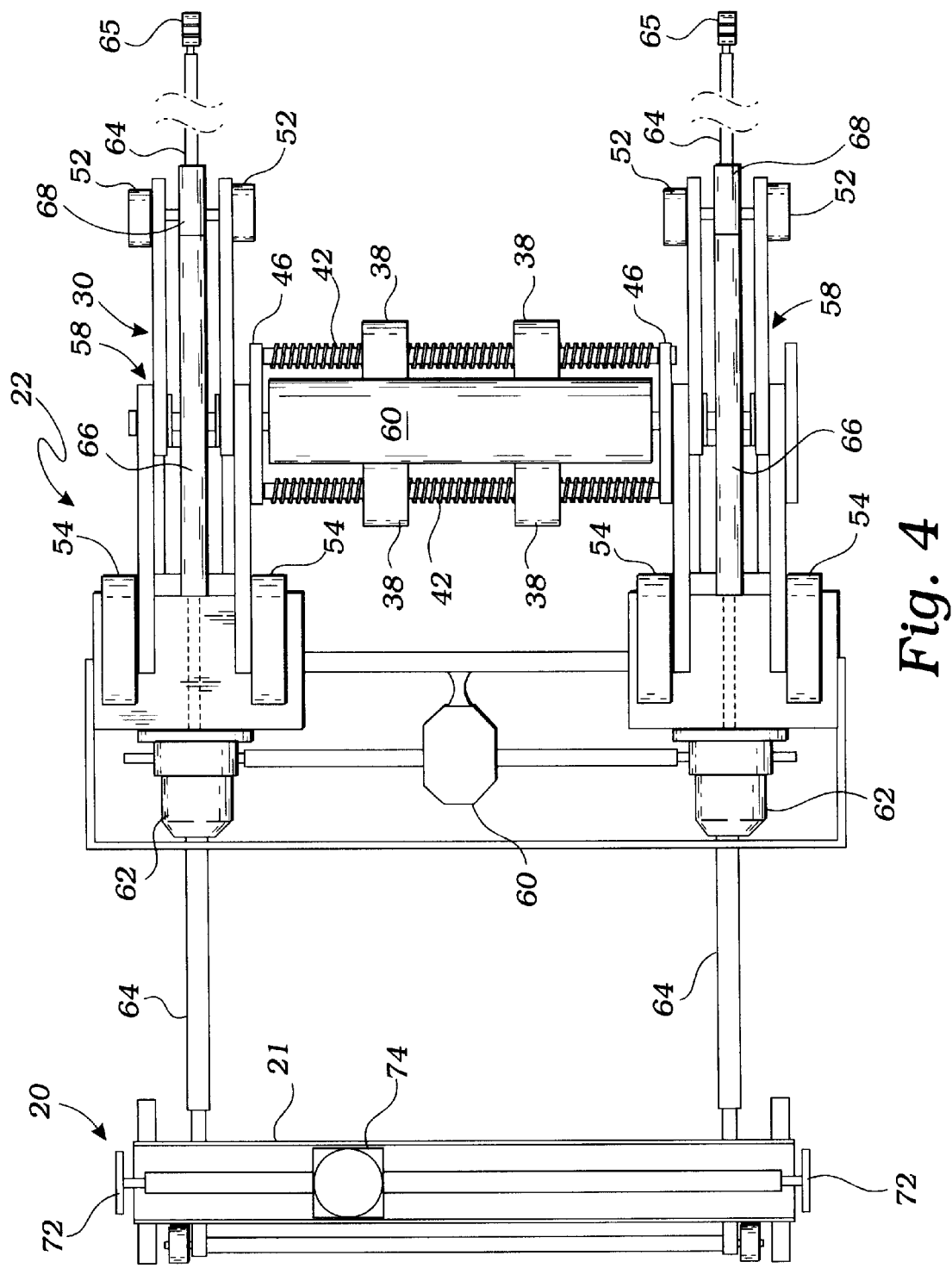
FIG. 4 is a top plan view, of a second or rotational body or carriage having a third jack stand body or carriage secured thereto.

The rotational carriage 22 shown alone in FIGS. 4 and 5 and coupled to the other carriages in FIGS. 6–11, has a parallel lift motor 60 that operates two lift jacks 62 simultaneously. The lift jacks 62 transverse lift screws 64, each of which has a lift screw clip 65 at a first end. An elevation locking mechanism 66 keeps the drum 34 in an elevated position when needed. Two mid point locking bars 68 keep the two carriages 22, 24 in place when they are secured together, by receiving outer ends of stabilizer bars 70 from the dowel carriage 24. This provides additional longitudinal support when the carriages 22, 24 are brought together.

The jack stand base 21 is secured between carriages 20 and 22 and rides second ends of the two lift screws 64. The base 21 may be locked onto the lift screws 64, as by means of a locking hand wheel 72. A jack stand tower 74 is removably held in the jack stand base 21, and is secured in place once a vehicle is elevated, as described below.

Turning now to FIGS. 1–3 and 6–11, the dowel carriage 24 includes a pair of rotatable dowels 76, 77 that are connected linearly by a linear dowel shaft 78. The dowel shaft 78 is supported by positional gearing mechanism 80 that can move along a gear rack 81 by means of an actuating mechanism 82, such as a motor or a hand wheel. The dowels 76, 77 include cutting or dowel knives 84, preferably held therein. The knives 84 can be actuated by any known means, such as hydraulic or air pressure to drive the knives outwardly from outer ends of conical shaped portions 106, 107 of each dowel 76, 77. The dowels 76, 77 are positionable so that they may be activated to move towards each other by means 86, such as a dowel jack motor. The dowel jack motor 86 turns a pair of dowel jacks 88 that operate in tandem, to turn dowel jack screws 90 so as to pull the dowels 76, 77 together or move them apart, as the jack screws feed through dowel jack travel nuts 92. The dowel carriage 24 has a handlebar 93 having wheels 102 at either end thereof, connected between the two stabilizer bars 70. The stabilizer bars are connected to the dowel carriage 24 by means of two stabilizer blocks 94 (see FIGS. 2 and 3).

Figure 7:
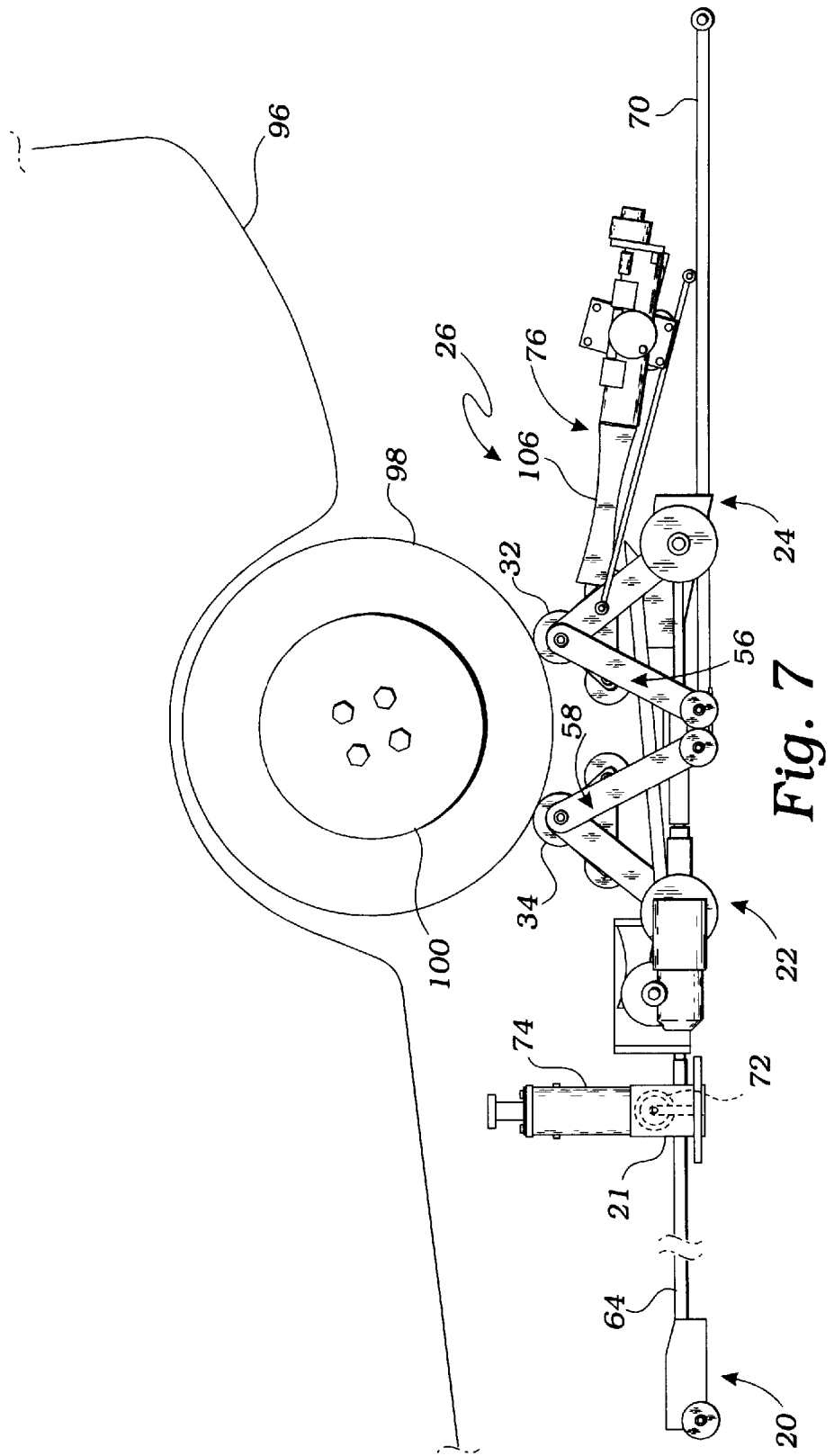
FIG. 7 is a further side elevational view showing the tire and wheel on a vehicle raised by the two main carriages, and the jack stand in place.
Figure 8:
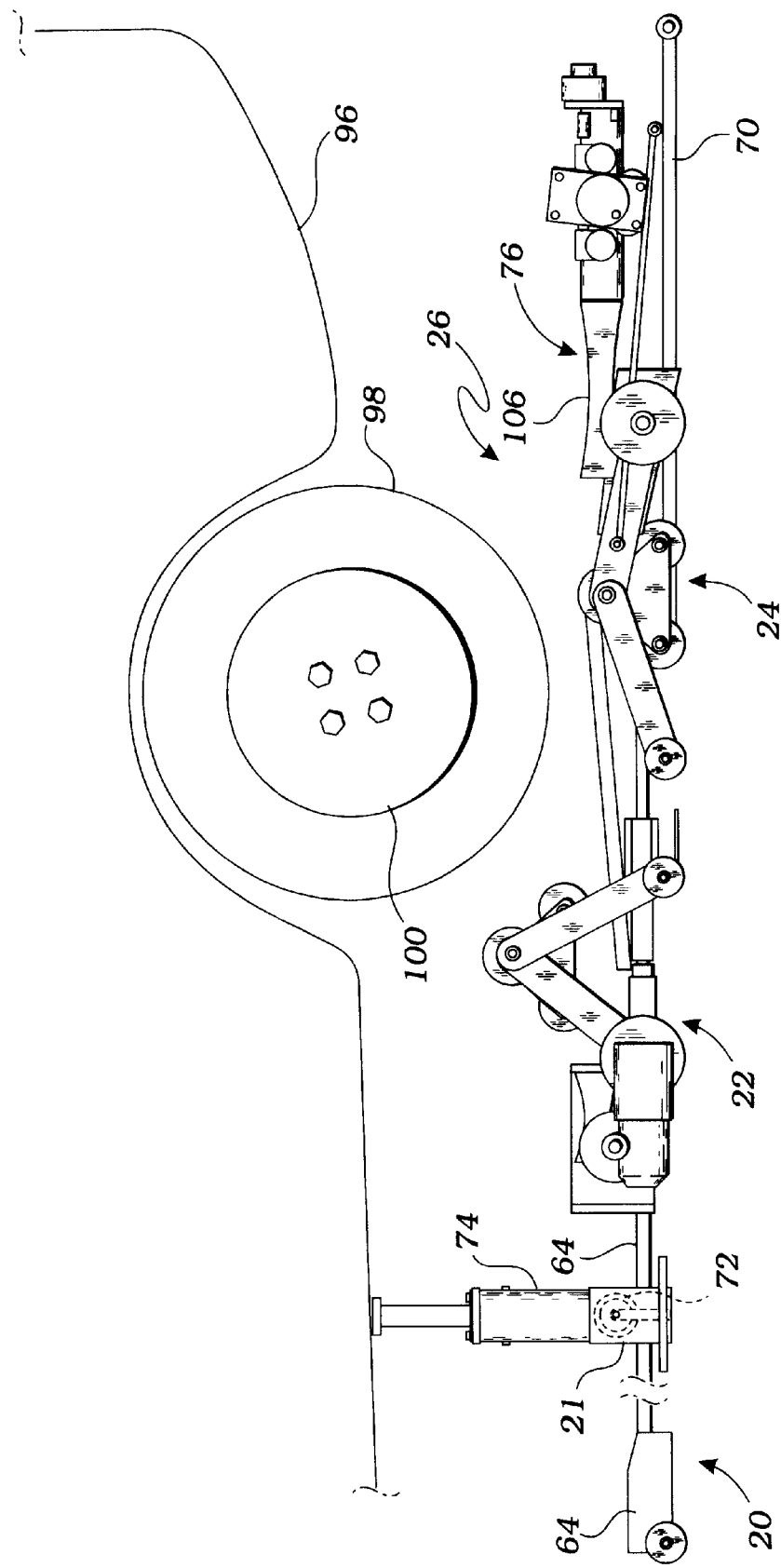
FIG. 8 is a further side elevational view with the dowel carriage lowered, the rotational carriage moved away from the tire and wheel, and the jack stand in position, under a vehicle, holding the tire and wheel off the ground.
Figure 9:
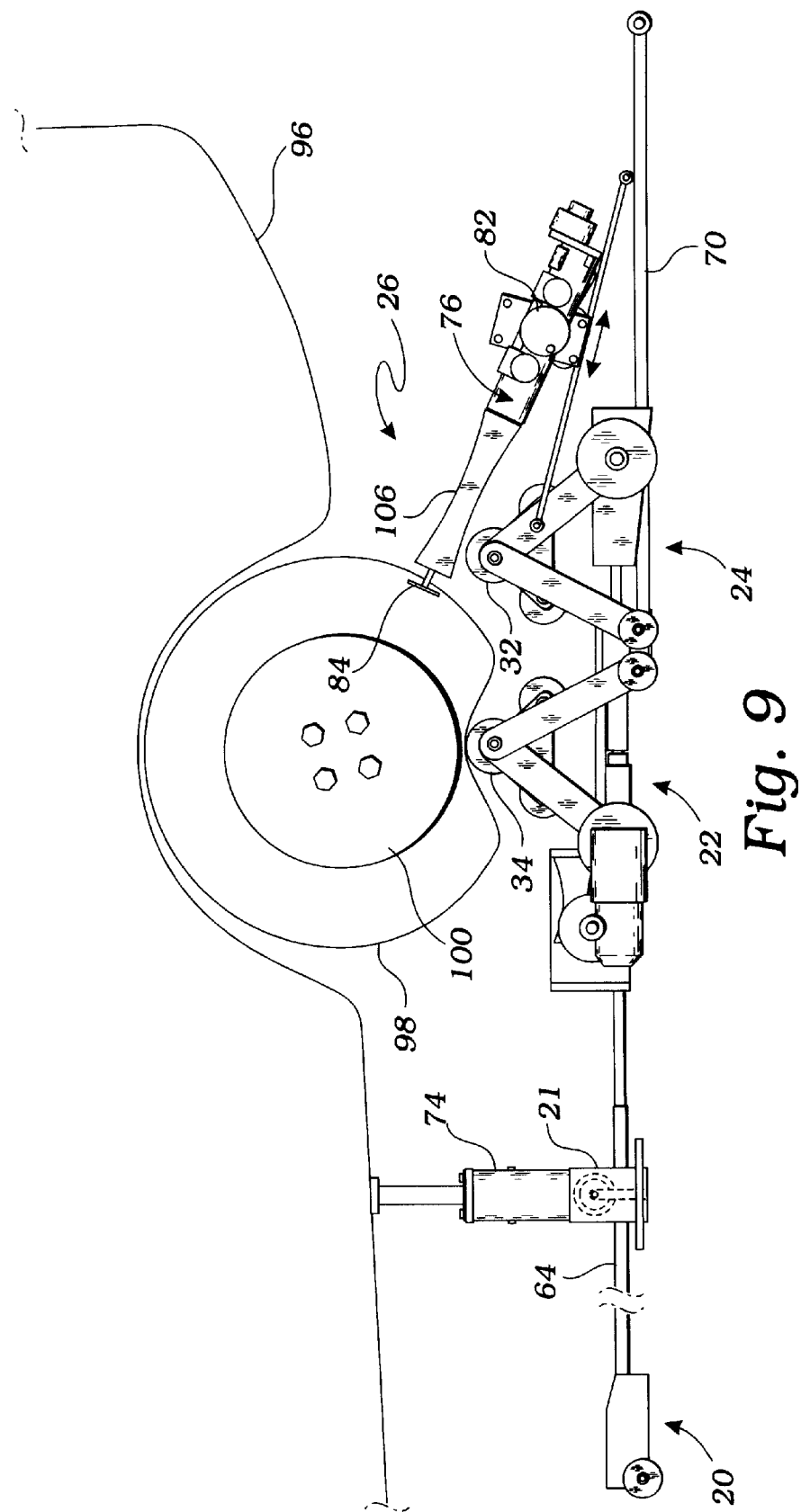
FIG. 9 is a further side elevational view showing the tire deflated, the drum of the rotational carriage moved into contact with the deflated tire, and the dowels on the dowel carriage moved into position with knife ends thereof against the sidewalls of the tire to cut the tire.
Figure 10:
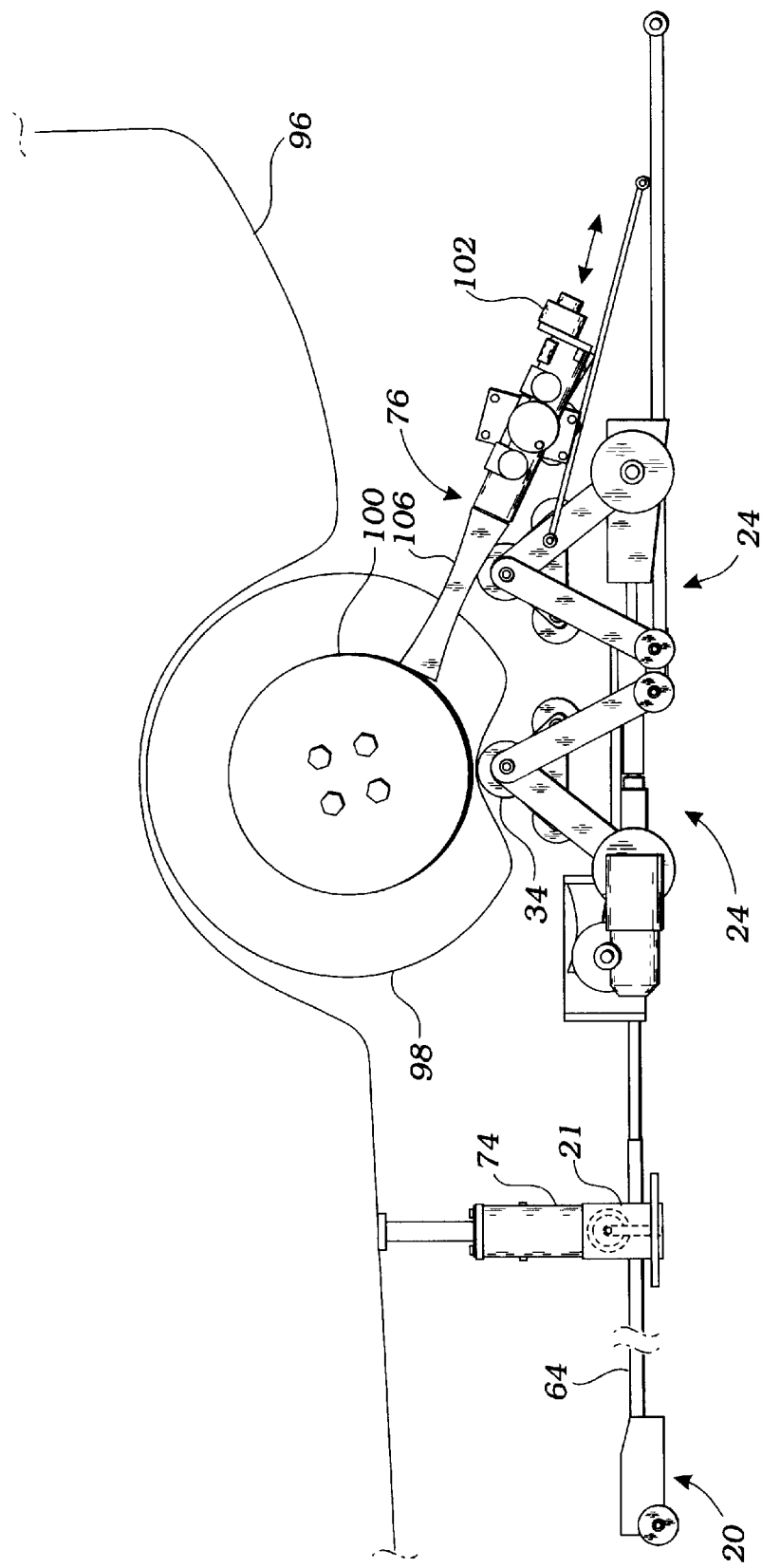
FIG. 10 is a further side elevational view similar to FIG. 9, with the knife ends of the dowels retracted and the dowels in position to remove the tire.
Figure 11:
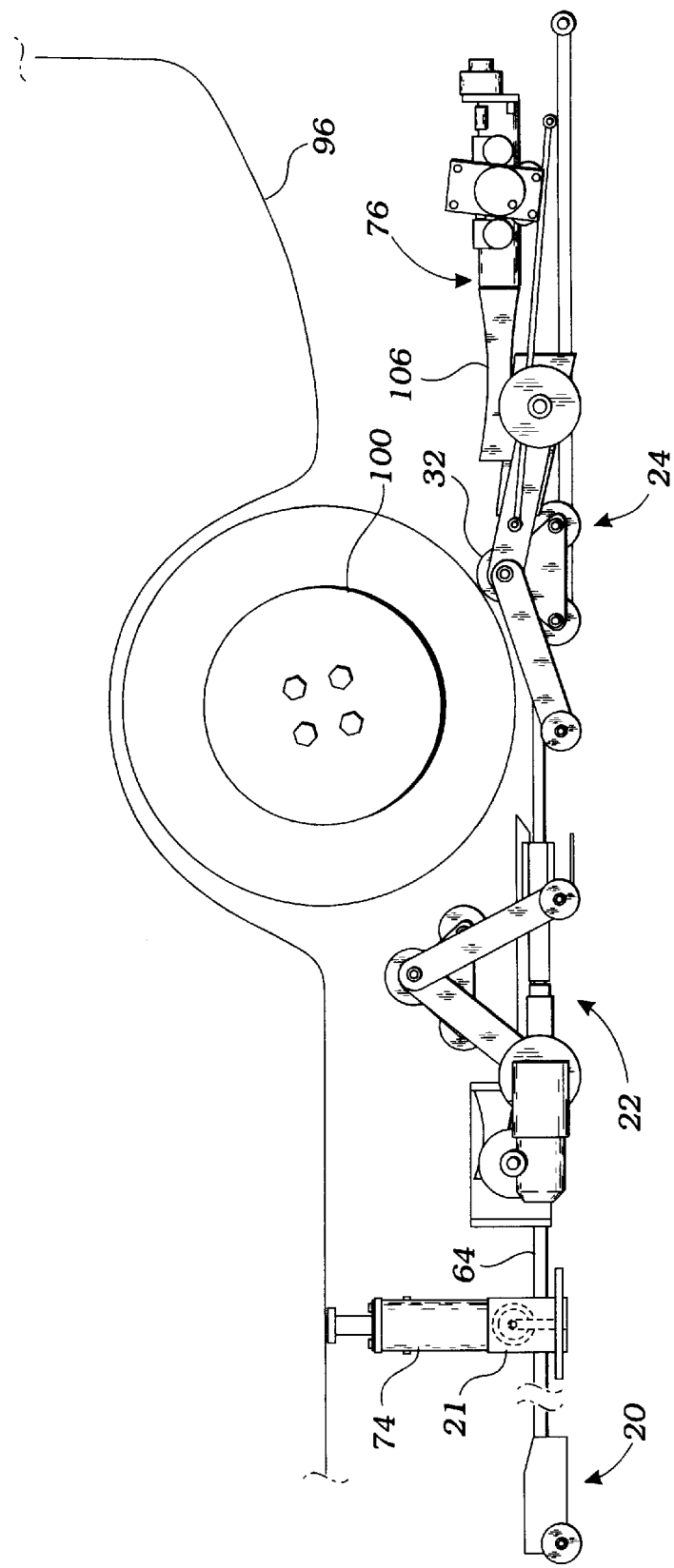
FIG. 11 is a still further side elevational view similar to FIG. 10 with the dowels removed after a new tire has been mounted and inflated; with a second drum on the dowel carriage moved against the tire, whereby the tire may be turned by the drum to balance the tire and wheel.

The operation of the apparatus 26 of the present invention will now be described. To perform a tire balancing or changing operation the rotational carriage 22 is rolled under a vehicle and the two lift screws 64 are made to straddle a tire 98 to be changed. The body of the rotational carriage 22 preferably has the jack stand carriage 20 secured thereto and is always located between the front and rear tires in order to place the jack stand base 21 in position to support the frame of the vehicle with the jack stand tower 74, once the vehicle is elevated. After the rotational carriage 22 and jack stand carriage 20 are in place, the dowel carriage 24 is rolled into position and aligned with the lift screw clips 65 of the rotational carriage 22. The dowel carriage 24 and rotational carriage 22 are pushed together until the lift screw clips 65 lock with the stabilizer blocks 94 of the dowel carriage 24. The handlebar 93 and corresponding stabilizer bars 70 are pushed or shoved inwardly towards the rotational carriage 22 to lock the stabilizer bars into the mid point locking bars 68 on the rotational carriage, thus providing extra longitudinal support between the two carriages 22 and 24. The parallel lift motor 60 is then activated to bring the carriages 22 and 24 together as it pulls the lift screws 64 through the lift jacks 62, thereby causing the scissor arms 56, 58 of each carriage 22, 24, to move upwardly. The two drums 32, 34 engage the tire 98 and lift the tire, its wheel 100 and the vehicle 96 (see FIG. 7). The load of the vehicle is carried by the linear wheels 36, 38. The ability of these linear wheels 36, 38 to move linearly helps to align the drums 32, 34 on the apparatus 26 with the face (tread) of the tire 98. When the rotational carriage 22 and dowel carriage 24 are brought together by the lift screws 64 and operate the scissor arms 56, 58 upwardly, the load is then carried by the scissor arms and, therefore, the rubber wheels 48, 50, 52, 54 of each carriage. The carriages 22, 24 are brought together until the tire 98, wheel 100 and vehicle 96 are sufficiently elevated off the ground so that the jack stand tower 74 can be fitted under the vehicle (FIG. 7). The jack stand base 21 had been or is moved into the desired position and the tower 74 set inside the jack stand base so as to support the frame of the vehicle 96 when the carriages 22, 24 are drawn apart, lowering the scissor arms 56, 58 and lowering the tire 98 back toward the ground, as by reversing the parallel lift motor 60.

Once the tire 98 is suspended off the ground and the two carriages 22, 24 backed away from the tire (see FIG. 8), the locking hand wheel 72 of the jack stand base 21 is tightened in order to grip the two lift screws 64 and, therefore, keep the dowel carriage 24 from moving laterally. The tire 98 is deflated and the parallel lift motor 60 activated to drive the rotational carriage 22 along the lift screws 64 into the deflated tire in order to establish a non-slip contact between the tire 98 and wheel assembly 100 of the vehicle 96 and the drum 34 of the rotational carriage (see FIG. 9). As the rotational carriage 22 is moved into the tire 98 it also pushes against the now laterally locked dowel carriage 24, thereby forcing the dowel carriage to elevate its drum 32. However, the drum 32 does not touch the tire 98. The drum 32 of the dowel carriage 24 acts as an adjustment mechanism for the two dowels 76, 77 that are now resting above or on top of the drum. The dowels are moved by means of the hand wheel 82. The dowel knives 84 may be actuated to pop out of the dowels 76, 77. Then, when the dowel jack motor 86 is operated, the two dowels 76, 77 will be brought together along the linear dowel shaft 78. The rotational drum 34 of the rotational carriage 22 is activated so that it rotates the tire 98 across the extending dowel knives 84 of the dowels 76, 77 and, therefore, cuts the tire around its circumference. This cutting operation is optional, depending on whether or not the customer wishes to keep their tires.

Whether or not the tire is cut, the dismounting of the tire or the remaining sidewalls of the tire is accomplished by means of the dowels 76, 77. The dowels 76, 77 are moved into place so that they are diametrically aligned with the circumference of the rim 100. The dowel knives 84, if not retraced, are moved into their normally retracted position within the dowels 76, 77. The outside dowel 76 (in relation to the outside of the vehicle 96) is moved into contact with the outside sidewall of the tire 98 by locking the other or inside dowel 77 from moving be means of a locking device affixed to a locking collar portion 108 of the linear dowel shaft 78. The conical shape portion 106 of the dowel 76 rotates against the sidewall of the tire 98 as the rotational drum 34 of the rotational carriage 22 is operated. The dowel jack motor 86 and dowel jacks 88 work to compress the outside dowel 76 against the sidewall of the tire 98 thereby breaking the seal between the tire bead and flange of the rim 100. Once this occurs the dowels 76, 77 are repositioned so that the outside dowel 76 is locked by a locking collar portion 104 of the linear dowel shaft 78. The same procedure is used to break the seal of the tire bead and rim flange on the inside sidewall of the tire. The inside dowel 77 is allowed to continue to move longitudinally across the width of the rim 96 while the rotational drum 34 turns the tire 98. This simultaneous action pulls the tire over the outside flange of rim 100 and displaces the tire from the rim.

The carriages 22, 24 are separated by reversing the parallel lift motor 60 to make room to remove the old tire and place a new tire in position for installation on the rim 100. When the new tire is placed into position against the rim 100, the drum 34 of the rotational carriage 24 is moved into contact with the tire and drives the tire into the rim. The dowel carriage 22 is elevated to bring the dowels 76, 77 into position. The inside dowel 77 is still locked which forces the outside dowel 76 to move longitudinally while the rotational drum 34 is activated to turn the tire against the outside dowel 76. This movement compresses the tire beads over the outer flange of the rim 100. Once the new tire is displaced over the outer flange of the rim 100 it is inflated.

The final step in the process of the present invention is to unlock the jack stand base 21 grip on the lift screws 64 by loosening the locking hand wheel 72. The carriages 22, 24 are then moved in a manner to bring the drum 32 of the dowel carriage 24 into contact with the new tire. This high speed drum 32 spins the new tire and wheel 100 fast enough to allow the tire and wheel to be balanced on the vehicle.

It, therefore, can be seen that the apparatus and methods of the present invention allow a person to easily dismount or mount tires onto a vehicle wheel without having to remove the wheel from the vehicle. The invention may also be used to cut tires into several pieces for easier disposal and to balance a new tire and wheel on the vehicle.

It is to be understood that because of the vast array of tires presently available for the many types of vehicles on the road, various size jack stands, dowel carriages and rotational carriages would be required, as long as they are assembled and work together, as described above.

Those skilled in the art will appreciate that there are adaptations and modifications of the just-described preferred embodiments that can be configured without departing from the scope and spirit of the invention. Therefore, it is to be understood, that within the scope of the intended claims, the invention may be practiced other than is specifically described herein.

What is claimed is:

1. A tire dismounting and mounting apparatus, comprising:
    a plurality of bodies; at least one of the bodies having means for rotating a tire mounted on a wheel on a vehicle;
    means for operating the means for rotating a tire mounted on a wheel mounted on a vehicle;
    one of the bodies having means for breaking tire beads of a tire mounted on a wheel mounted on a vehicle; and
    means for operating the means for breaking tire beads of a tire mounted on a wheel mounted on a vehicle.

2. The tire dismounting and mounting apparatus of claim 1 wherein there is a rotational body and a dowel body and the means for rotating a tire mounted on a wheel mounted on a vehicle includes a drum rotatably held in the rotational body.

3. The tire dismounting and mounting apparatus of claim 2 wherein the means for breaking tire beads of a tire mounted on a wheel mounted on a vehicle is movably mounted on the dowel body.

4. The tire dismounting and mounting apparatus of claim 3, further including a jack stand body secured to the rotational body.

5. The tire dismounting and mounting apparatus of claim 4, further including means for cutting a tire mounted on the dowel body.

6. The tire dismounting and mounting apparatus of claim 5 wherein the rotational body includes a pair of jack screws secured to the jack stand body and the dowel body.

7. The tire dismounting and mounting apparatus of claim 6 wherein the means for cutting a tire mounted on a wheel mounted on a vehicle are knives mounted in opposed dowels operatively mounted in the dowel body.

8. The tire dismounting and mounting apparatus of claim 7, further including a plurality of wheels mounted on each of the plurality of bodies to enable each of the plurality of bodies to be moved under and around a tire and wheel mounted on a vehicle.

9. The tire dismounting and mounting apparatus of claim 1 wherein the means for rotating a tire mounted on a wheel includes a drum rotatably held in a rotational carriage held between a dowel carriage and a jack stand carriage.

10. The tire dismounting and mounting apparatus of claim 9 wherein the dowel carriage includes a pair of movable dowels for breaking tire beads of a tire mounted on a wheel mounted on a vehicle.

11. The tire dismounting and mounting apparatus of claim 10 wherein the pair of movable dowels are capable of being raised and lowered into contact with a tire mounted on a wheel mounted on a vehicle, as well as translatable across the face of the tire.

12. The tire dismounting and mounting apparatus of claim 11 wherein the jack stand carriage includes a jack stand base and a jack stand removably held in the jack stand base.

13. The tire dismounting and mounting apparatus of claim 12, wherein the jack stand base is movably mounted on a pair of jack screws secured between the jack stand carriage and the rotational carriage.

14. The tire dismounting and mounting apparatus of claim 13, further including a plurality of wheels on each of the plurality of bodies to allow the plurality of bodies to be moved around on a surface.

15. A method of dismounting a tire from a wheel held on a vehicle, comprising the steps of:
    positioning a plurality of movable carriages together around and under a tire mounted on a wheel mounted on a vehicle resting on a surface;
    operating the plurality of movable carriages to lift the tire and vehicle from the surface;
    moving a pair of dowel tire bead deflectors held in one of the plurality of movable carriages into position adjacent the tire; and
    rotating the tire and the wheel while alternately moving the pair of dowel tire bead deflectors to remove the tire from the wheel.

16. The method of dismounting a tire from a wheel held on a vehicle of claim 15, including the further step of operating cutting elements held in the pair of dowel tire bead deflectors and cutting the tire into a number of sections.

17. The method of dismounting a tire from a wheel held on a vehicle of claim 15, including the further step of mounting a new tire on the wheel from which the tire has been removed.

18. The method of dismounting a tire from a wheel held on a vehicle of claim 16, including the further step of operating a motor to rotate a drum on one of the plurality of movable carriages to rotate the tire while the pair of dowel tire bead deflectors are moved to break the tire beads.

19. The method of dismounting a tire from a wheel held on a vehicle of claim 18, including the further step of moving cutting knives held in the pair of dowel bead deflectors into position to cut the tire into a number of sections when the tire is rotated.

20. A method of mounting a tire on a wheel held on a vehicle, comprising the steps of:
    repositioning a plurality of movable carriages secured together and held around and under a wheel held on a vehicle;
    placing a tire to be mounted on the wheel held on the vehicle;

bringing a drum from one of the plurality of movable carriages into contact with a face of the tire to be mounted on the wheel;

moving a pair of tire bead deflectors into contact with the tire to be mounted on the wheel; and rotating the tire by the drum while alternately moving the pair of tire bead deflectors against the tire to mount the tire onto the wheel.

21. The method of mounting a tire on a wheel held on a vehicle of claim 20, including the further step of inflating the mounted tire.

22. The method of mounting a tire on a wheel held on a vehicle of claim 20, including the further step of bringing a second drum on a second of the plurality of carriages into contact with the face of the inflated tire and rotating the tire and wheel to balance the same.

23. A method of cutting a tire into more than one piece comprising the steps of:

positioning a tire changing apparatus having a plurality of movable carriages secured together around and under a tire mounted on a wheel held on a vehicle;

raising the tire mounted on a wheel held on a vehicle above a surface by moving two of the plurality of movable carriages;

moving tire cutting elements held in a first of the plurality of movable carriages into the tire mounted on a wheel; and moving the means for cutting tires into contact with and through sidewalls of the tire while rotating the tire mounted on a wheel by means of a drum held in a second of the plurality of movable carriages.

24. The method of cutting a tire into more than one piece of claim 23, including the further step of deflating the tire before cutting and rotating the tire.

25. The method of cutting a tire into more than one piece of claim 24, including the further steps of providing knives held in rotatable dowels on the first of the plurality of movable carriages to cut the tire and operating a motor to move the knives into contact with and through the sidewalls, while operating a second motor to rotate the drum to rotate the tire.

* * * * *